Sept. 3, 1968 — Y. M. PONSAR — 3,399,573
METHOD AND APPARATUS FOR DETERMINING RELATIVE DENSITIES
Filed June 8, 1965 — 3 Sheets-Sheet 1

INVENTOR.
Yves M. Ponsar

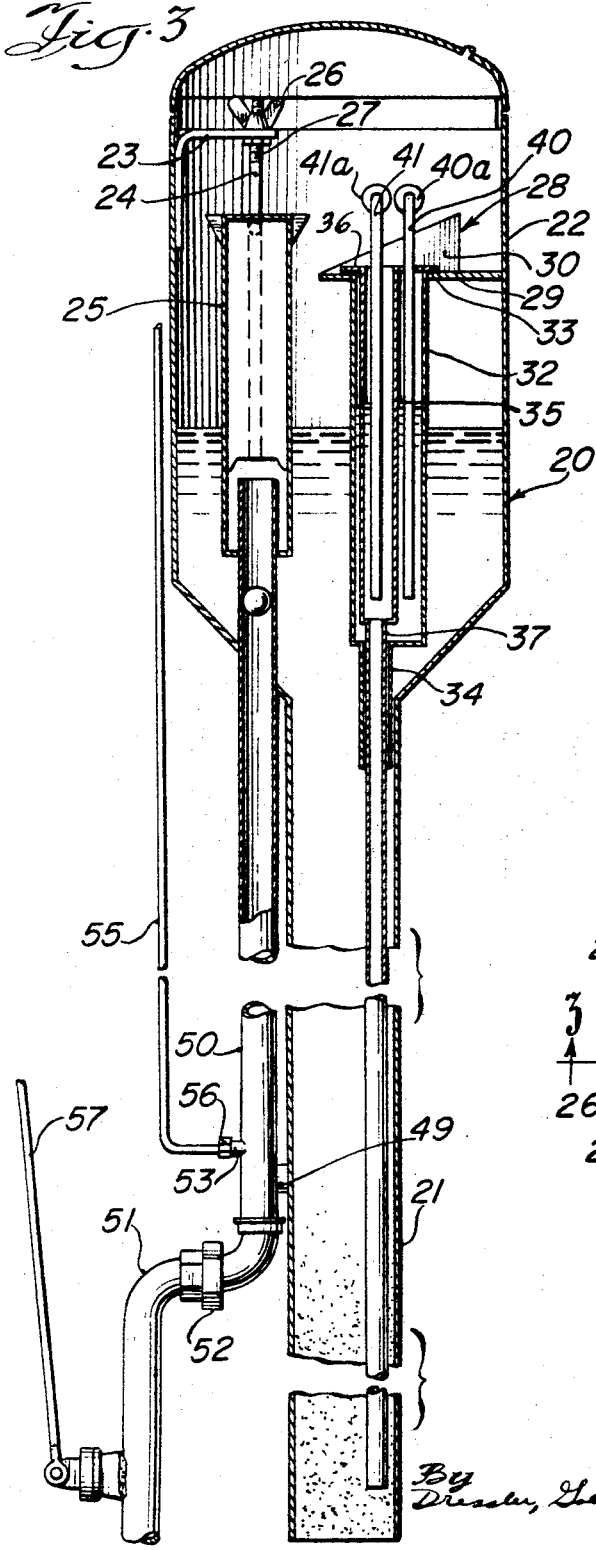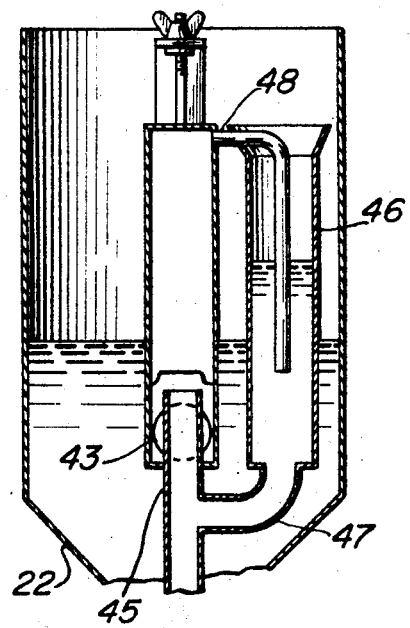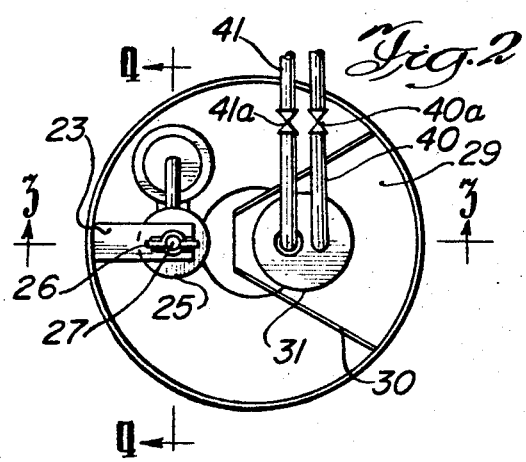

Sept. 3, 1968  Y. M. PONSAR  3,399,573

METHOD AND APPARATUS FOR DETERMINING RELATIVE DENSITIES

Filed June 8, 1965  3 Sheets-Sheet 3

INVENTOR.
Yves M. Ponsar
By Dressler, Goldsmith, Clement, Gordon & Lodd Attorneys United States Patent Office 3,399,573
Patented Sept. 3, 1968

3,399,573
METHOD AND APPARATUS FOR DETERMINING RELATIVE DENSITIES
Yves M. Ponsar, 6 Ave. Marcelin Berthelot, Villemomble, Seine-St-Denis, France
Filed June 8, 1965, Ser. No. 462,373
6 Claims. (Cl. 73—438)

ABSTRACT OF THE DISCLOSURE

This invention deals with an apparatus for measuring the apparent density of a suspension of solids wherein a portion of the suspension is withdrawn from the main body of suspension through piping which introduces the suspension into a vertical positioned duct, the bottom outlet of which is submerged in the main body of suspension. As the suspension flows through the duct, it acts as the submerging medium for two vertically spaced tubular members inside of which is the solids free liquid of the suspension. Gas conduits for bubbling gas into the liquid in each of said tubular members is submerged in the liquid in said tubular members. The gas conduits have branch conduits interconnected by means responsive to back pressure on the gas in said conduits whereby a differential in pressure correlatable to apparent density is indicated.

---

The present invention relates to an apparatus for indicating the solids content of suspensions. More particularly, it relates to apparatus for measuring small density differentials and converting same to an actuating signal for process control apparatus. Still more particularly, it relates to apparatus and a method for measuring the relative density of a suspension in a process for treating water or aqueous sewage.

Briefly, the method for measuring the relative density of a liquor or a relatively homogenous suspension of solids, or a stratum of a suspension of solid matter, for example, in a holding zone or settling tank, comprises establishing within said suspension substantially quiescent columns of liquor wherein a natural decantation may take place, said columns communicating with said suspension through bottom outlets positioned at spaced elevational levels, making a measurement reflecting liquid level at a location in each of said columns above the level of the highest elevationally of said bottom outlets of said columns, and comparing the measurements at a point outside of said holding zone whereby the differential between measurements is correlated to the relative density of said suspension of solids.

One method of establishing conditions permitting a measurement reflecting liquid level at a location in each of said columns is to move gas, such as air, under pressure in a conduit system so that a portion thereof is discharged into each of said columns of liquor in the form of bubbles and directing the back pressures or remainder of said gas from each discharge line to a point outside of said holding zone where the differential in back pressures exerted on the gas by the columns of liquor is indicated.

The back pressure difference provides an indication of the relative difference in density between the suspension of solids and the suspending liquid, which may be translatable into parts per million of suspended solids, or other desired indicia of conditions in the suspension.

Measurement of the differential in back pressure exerted on two independent columns having the bottom outlets therefrom submerged to spaced predetermined depths in a suspension of solids may be accomplished, for example, by vertically positioning a duct in a tank, said duct having located therein a pair of tubular members, each of appreciably smaller dimensions than the duct, the upper ends of which members extend above the normal liquid level maintained in the duct and the bottom ends of which extend to different elevation within the duct. These tubular members contain liquor sustained at independent levels which is formed by natural settling of solids from suspension or by introducing a liquor of predetermined character into said tubular members. The tubular members, each have an air conduit positioned therein with bottom outlets submerged to predetermined levels, said air conduit having branch portions whose outlets communicate with a system responsive to back pressures exerted through the air conduit for balancing the pressure in opposing relationship and adapted to provide a signal of practical proportions for control mechanism actuation. The suspension of solids is brought into the duct by a liquid conduit which communicates at one end with the interior of the duct and at the other end is adapted for movement of liquid from any desired elevation in the suspension in the tank. The liquid conduit is provided with suitable means for moving the suspension of solids therethrough in desired quantities.

The apparatus of this invention is of a type having utility to assess the concentration of solids in suspension and particularly to access the concentration of solids in suspension in an activated sludge treatment system or modifications thereof, in systems for treatment of industrial waste, in systems for purification of water, in fermentation plants, and the like.

Controls of the character, i.e., solids concentration of suspension, timing for solids removal, and ultimately settling characteristics of solids in suspension, etc., are major problems in the efficient operation of treatment plants, For example, the problems are acute in an activated sludge type of plant. In each situation, imbalances in quantities of sludge recycled or wasted can lead to loss of settling character, too little or too great quantities of solids in various portions of the system, etc., thus reducing the effectiveness of the treatment.

Now it has been discovered that better control of the systems can be maintained when there is prompt determination of a change in the character of the sludge, i.e., determination of whether the sludge volume index is increasing or decreasing, whether the sludge blanket is stationary, rising or falling, etc. Apparatus of the type herein described is sensitive to changes and is capable of promptly indicating the direction of the change and to permit or to direct corrective measures before imbalances seriously interfere with plant operations.

Prompt determination of a change in solids concentration can be made when two columns of liquor of different lengths are established with the bottom outlets from said established columns in communication with a common medium or independent medium at least one of which is a solids suspension or a liquor of higher density, through the medium of the differential in back pressure exerted on gas being bubbled into said columns of liquid. The differential provides a measure of the relative weight of solid matter in suspension per unit of volume, which differential is measurable on a continuous or intermittent basis and can be integrated into a system as a sensitive actuating means to provide control over one or more variables in the process known to be capable of bringing about changes in the character of the solids.

Gas being fed to the system has a pressure thereon which maintains the air conduit lines at least substantially free of the liquor present in the independent columns. This pressure generally will at least balance or be slightly in excess of the hydrostatic head or pressure on the outlet from each air conduit. Inasmuch as each air conduit may be subjected to a definite hydrostatic head, the pressure of the air communicating with each column of liquor may be different and such a pressure may be induced by suitable control of the rate of gas flow, by an orifice in the specific air line, a valve, etc. In normal operation, discharging of small discrete bubbles of air occasionally from the air conduit will give visual evidence that the air pressure is sufficient to maintain the air conduit free of liquor.

In accordance with the present invention, as applied to the treatment of sewage, an aqueous sewage may be introduced into an aeration chamber where the incoming sewage may be mixed with previously treated material to form a mixed liquor. Treated mixed liquor and suspended solids may be continuously removed from the aeration chamber and introduced into a quiescent or settling chamber wherein solids are concentrated and a clarified supernatant liquor is overflowed from the settling chamber.

In one embodiment of the apparatus in a form adapted to assess relative density of a suspension of solids in a tank, container or receptacle where the solids are maintained in suspension through agitation, the apparatus comprises two tubular members which extend to spaced elevational levels within the suspension in a substantially vertical arrangement or at substantially the same acute angle of inclination. The liquid level in the tubular members is independently determined by suitable means and means for comparing the liquid level measurements is provided whereby the differential between measurements is correlated to the relative density of said suspension of solids with which the outlets of the tubular member communicate.

In one form of the apparatus, the liquid level determination is measured by means of air conduits positioned within said tubular members with openings intermediate the liquid level therein and the bottom outlet from said tubular members, the air conduits preferably terminating at the same elevational level. The air conduits have branches which communicate with a system responsive to back pressure exerted on the air in the air conduits.

In another embodiment of the apparatus in a form particularly adapted to assess solids concentration of the sludge at any level in the settling tank, the apparatus comprises a vertically positioned duct having smaller dimensioned tubular members positioned therein, preferably with the tubular members nested one within the other, which extend to spaced elevational levels within the duct. Air conduits communicating with a source of air under pressure is positioned in said tubular members with bottom outlets submerged to predetermined levels. Said conduits have branches interconnected by means responsive to the difference in back pressure on the air between the air conduits, for example, a pneumatic relay system. The duct has associated with it a pipe adapted for movement of the suspension of solids therethrough, said pipe communicating at one end with the interior of the duct and having the other end adapted for movement of the inlet thereof to any desired level in the suspension in the settling tank. The pipe is provided with suitable means for moving the suspension of solids through said pipe. Generally, the pipe is composed of a fixed portion and a movable portion connected to the fixed portion by a swivel joint, positioning of the movable portion being made by means of rods or cables.

Movement of the suspension of solids through the pipe may be induced by an air lift, a pump or other suitable means. This movement of suspension of solids is in such volume that the flow through the duct is at a rate at least exceeding the settling rate of the solids. The suspension of solids is preferably introduced into the duct near its static liquid level and at such a rate that the hydrostatic head thereby imposed is sufficient to produce uniform flow through the duct while not sufficient to incur a substantial head loss therein.

However, it turbulent conditions in the tank cause fluctuations in the liquid levels within the duct and tubular members, the duct may be closed at the bottom and a liquid level established by a suitable overflow arrangement by means of which solids suspension is discharged from the duct.

One of the advantages of this system is that measurement of a change in relative density can be made with far greater accuracy than a change in the actual densities of two mediums. Another advantage is that the liquor in the columns standing surrounded by a suspension moving in an enclosure comes to and is maintained at the same temperature as the suspension, thus making for measurement of relative density without the necessity for compensation for temperature differences.

The capabilities and effects of the invention will be apparent to those skilled in the art by the following description of a preferred embodiment thereof taken in connection with the accompanying drawings:

FIGURE 2 is a top plan view of the solids concentration sensing apparatus;

FIGURE 3 is a cross-sectional and enlarged view along line 3—3 of FIGURE 2, of the mechanism positioned within the settling tank;

FIGURE 4 is a view along line 4—4 of FIGURE 2;

Figure 1:
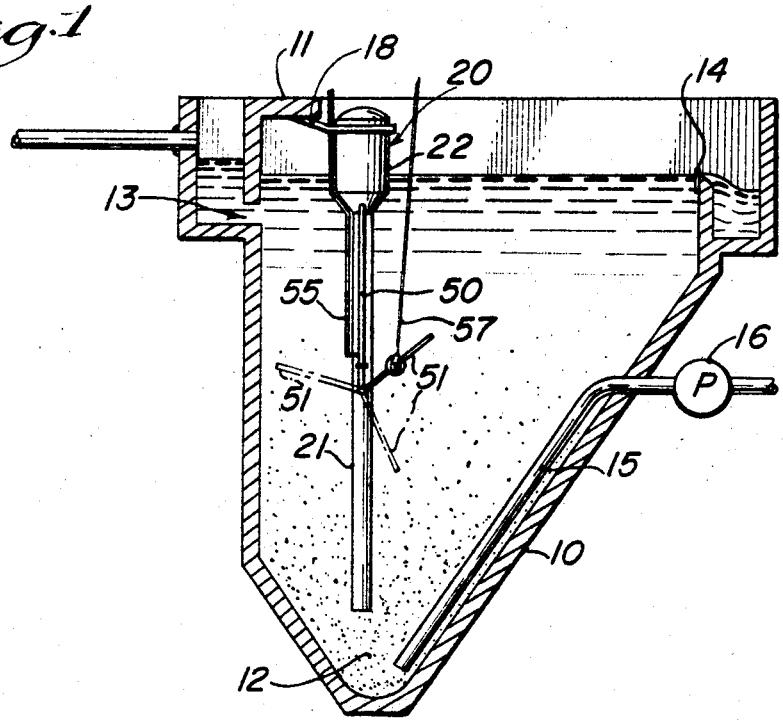
FIGURE 1 is a diagrammatic view showing a cross-sectional view of a settling tank provided with a solids concentration sensing device of the present invention.

Referring to FIGURE 1, the numeral 10 indicates a settling tank having a coping 11 and a sump portion 12 adapted to accumulate settled solids. Tank 10 is provided with an inlet 13 for the suspension to be settled and an overflow weir 14 for discharge of clarified liquid from the tank.

Tank 10 is provided with suitable means 15 such as a sludge removal line extending into sump portion 12 of the tank 10. Sludge removal line 15 is provided with means 16 such as an air inlet positioned intermediate the inlet and outlet from said pipe to form an air lift or a pump for moving concentrated solids. Solids removed from the sump, i.e., wasted from the treatment system, may be sent directly to subsequent processing stations or to intermediate holding stations, or may be completely discharged from the system.

Coping 11 supports, by means of a suitable bracket 18, a unit 20 forming the solids concentration sensing unit.

Referring to FIGURES 2 and 3, the illustrated relative density measuring or solids concentration sensing unit 20 consists of a duct 21 having an enlarged head portion 22. Head portion 22 may be open at the top or, if closed, may be vented to the atmosphere by suitable means. Mounted on the interior wall of head portion 22 of duct 21 is an angle iron or bracket 23. Angle iron 23 supports through a bolt 24, a tubular cap member 25. Tubular cap member 25 is rendered adjustable vertically by a wing nut 26 cooperating with a threaded portion 27 of bolt 24.

The interior wall of head portion 22 of duct 20 also has mounted thereon a bracket 28 consisting of a plate 29 having triangular shaped lips 30 at the edges thereof. Plate 29 is provided with an aperture 31 adapted to receive a tubular member 32. Tubular member 32 is provided at the top with a flange 33 adapted to support tubular member 32 from the plate 29. At the bottom, tubular member 32 is constricted to a portion 34 of short length and lesser diameter.

Tubular member 32 has mounted within it a cyindrical member 35. Cylindrical member 35 is provided with radially extending arms 36 which support the cylinder from the top of tubular member 32. Cylindrical member 35 is constricted to a leg 37 which extends downwardly through and beyond portion 34 of tubular member 32, a predetermined distance, but not a distance extending beyond the end of duct 21.

Cylindrical member 35 and tubular member 32 have air conduits 40 and 41 positioned therein. Air conduits 40 and 41 communicate with a common source of air, not shown. Flow of air through lines 40 and 41 may be controlled through pressure and flow control devices 40a and 41a.

In FIGURE 4, there is illustrated one embodiment of the mechanism adapted to facilitate escape of air when an air lift system is utilized to move solids suspension into the duct. Tubular cap 25 is closed at the top and bottom and is provided with an outlet 43 for discharge of the suspension of solids into enlarged portion 22 of duct 21. Tubular cap 25 surrounds the outlet end of a conduit 45 for movement of a suspension of solids. Conduit 45 supports a surge pot 46 through branch conduit 47. Tubular cap 25 is provided with a side tube 48 which extends from adjacent the closed top of said cap to below the normal liquid level in surge pot 46.

Conduit 45 passes through the wall of enlarged head portion 22 of duct 21 and is secured by suitable means as by welding at the point where it passes through the wall and by welding to a flange 49 secured to duct 21. Conduit 45 consists of a fixed portion 50 and a movable portion 51 connected by a suitable swivel joint 52. Fixed portion 50 of conduit 45 is provided with an externally threaded nipple 53 adjacent the lowermost part thereof which has an orifice therethrough communicating with the interior of conduit 45. Nipple 53 has an air hose 55 joined thereto by suitable means such as an internally threaded collar 56. Movable portion 51 of conduit 45 has secured thereto a rod 57 which extends outside of the tank 10 and is adapted to rotate movable portion 51 through a turn of 360° and to hold the inlet of said movable portion 51 at any fixed elevational level.

Figure 5:
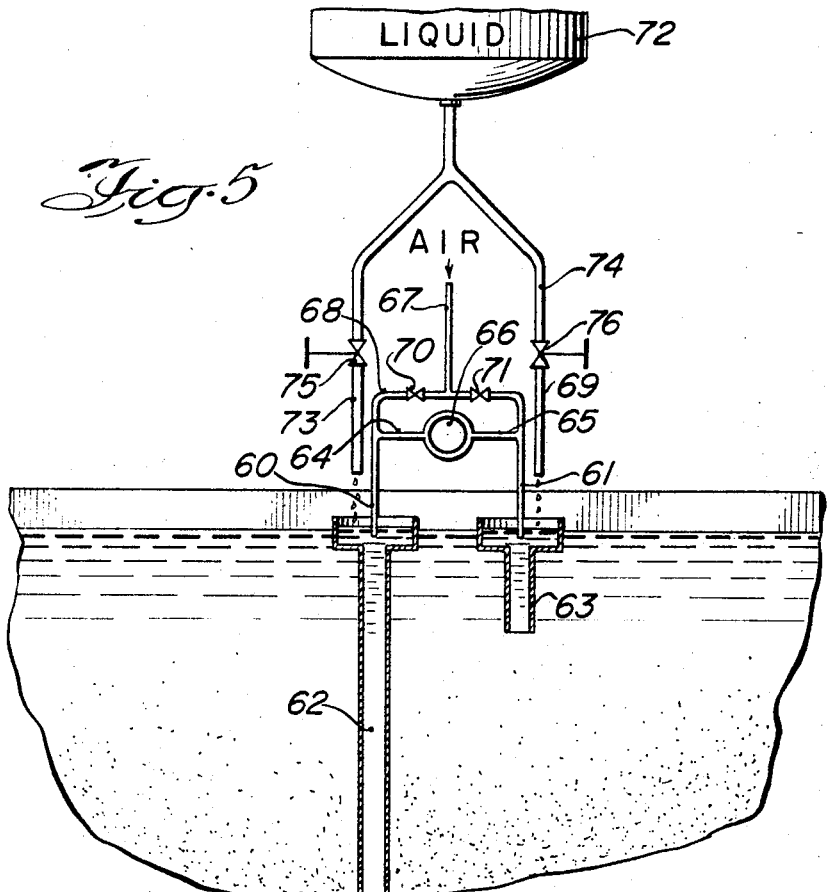
FIGURE 5 is a diagrammatic view in crosss section of one form of apparatus for translation of the differential in pressure between the two legs of the air system into an actuating signal of practical magnitude for operation of auxiliary equipment.

Air conduits 40 and 41 connect to suitable means for measuring the difference in back pressure on said air conduits 40 and 41 through branch piping. One means of measuring this difference is, as illustrated in FIGURE 5, to connect air conduits 60 and 61 which have the ends thereof submerged in the liquid in tubular members 62 and 63, respectively, by branch pipings 64 and 65 to opposite sides of a diaphragm system 66 arranged so that the movement of the diaphragm in response to differences in pressure will supply a signal or a magnified or reduced signal capable of controlling the operation of valves, pumps, etc., through, for example, an electrical on and off switch. Air is supplied to the system under suitable pressure, from a source not shown, through pipe 67 and pipes 68 and 69, the pressure being controlled by valve means 70 and 71.

To insure the correct difference in density between the liquid in tubular members 62 and 63 and the slurry in the holder, it is necessary to maintain the liquid in the tubular members free from suspended solids. One means for insuring relatively solids-free liquid in the tubular members is to provide a source of solids-free liquid such as a tank 72. Liquid is conducted from tank 72 by pipes 73 and 74 which extend to a point such that liquid is delivered to the interior of tubular members 62 and 63, respectively. Liquid flow in pipes 73 and 74 is controlled by valves 75 and 76. By introducing a small amount of liquid into the top of each tubular member, a small flow of liquid is induced in the direction of the bottom outlets of tubes 62 and 63, which flow will be a positive bar to solids entering the tubular members.

In another embodiment, air conduits 60 and 61 may be connected through the branch pipings 64 and 65 to a pneumatic relay holding liquid free to move between two chambers. In such a device, the air passing into the chamber operating under higher pressure is caused to pass through a suitable gas relief mechanism such as a needle valve, whereby the restriction on the escape of gas can be caused to induce a differential pressure of suitable magnitude relative to atmospheric pressure. Since this pressure difference is a function of liquid level displacement, it can be correlated to the density of the suspension in duct 21.

Figure 6:
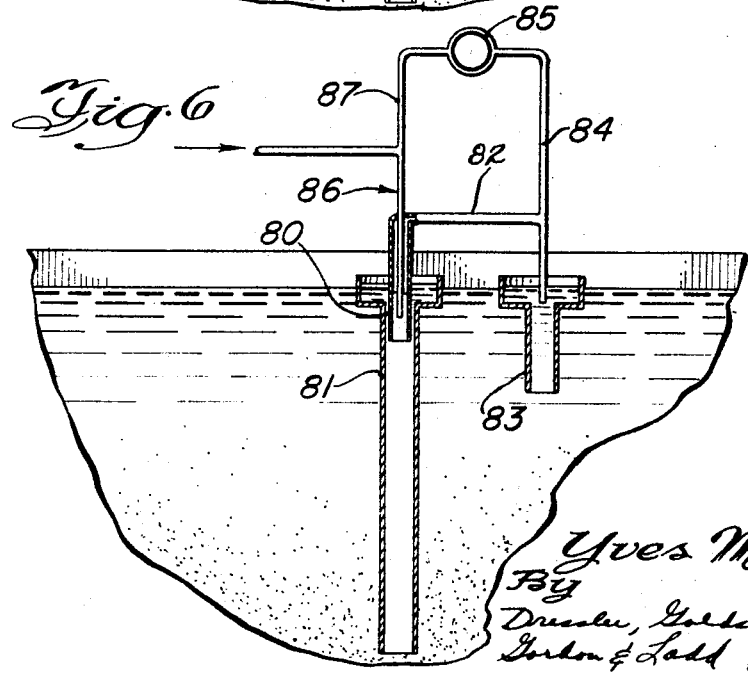
FIGURE 6 is a diagrammatic view in cross section of one form of apparatus wherein the two legs of the air system are interconnected.

The means for making measurements reflecting liquid level, whereby the differential between measurements may be correlated to the relative density of a suspension of solids, is further illustrated in FIGURE 6.

In this embodiment, a tube or fluid-tight chamber 80 which is closed on the sides and top and open at the bottom has the open end thereof submerged below the liquid level in the tubular member 81. Tube 80 communicates with tube 82 of lesser cross-sectional area which has the outlet thereof submerged below the liquid level in tubular member 83. Tubular members 81 and 83 may be open at the top or closed at the top. In either event, measurements will reflect liquid level differentials. An air pipe 84, communicating with the tube 82, is connected to one side of a diaphragm system 85 arranged so that movement of the diaphragm will supply a visual indication or a signal capable of activating parts of an integrated control system.

Air of predetermined pressure is introduced at a point below the liquid level in tube 80 through an air conduit 86 whose outlet is submerged to a greater depth than the outlet of tube 82. Air conduit 86 is provided with a branch pipe 87 which communicates with the opposite side of diaphragm system 85 from the connection of air pipe 84.

In such an apparatus, the air passing into the tube 80 through air conduit 86 has a greater back pressure exerted thereon than is exerted on the gas bubbling out of tube 82. Since this pressure difference is a function of liquid level plus a fixed differential due to differences in submergence of the outlet of the two air bubble tubes, it can be correlated to the density of suspension in the holder.

Figure 7:
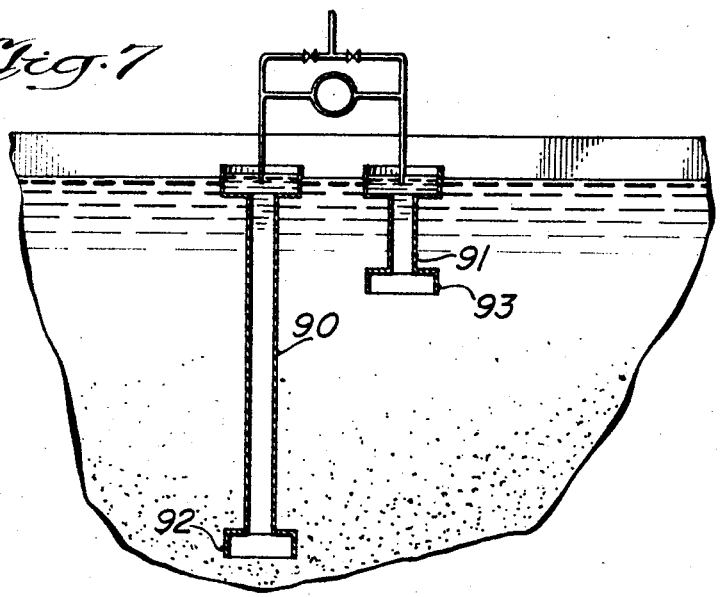
FIGURE 7 is a diagrammatic view in cross section of apparatus effective to keep solids from entering the tubes which should contain solids-free liquid medium.

In order to have an accurate measurement of relative density and to have the maximum differential upon which to base that measurement of liquid level, pressure, etc., it is necessary to maintain solids-free liquid in the tubular members submerged in a slurry. One means of maintaining this solids-free condition as illustrated in FIGURE 7 is to provide tubular members 90 and 91 at their submerged ends with enlarged sections 92 and 93. These tubular members with enlarged sections may be adapted to use, for example, with suitable means for measuring the difference in back pressure on air conduits as illustrated in FIGURE 5. The effect of such enlarged sections is to reduce the carrying velocity for solids generated, for example, by fluctuation in the liquid level in the tank so that the solids are not propelled upwardly in tubular members 90 and 91.

It will be recognized by those skilled in the art that said columns of liquor may be positioned outside of the tank or enclosure, provided the bottom outlets thereof communicate with a main body of suspension of solids, relative density of which is to be measured, at spaced elevational levels. It will also be recognized that more than one density measuring unit may be installed in tanks holding suspensions of sludge so as to measure relative density of sludge continuously at a multiplicity of elevational levels from which determinations manual or automatic control may be based upon the measurements individually or in combination.

Although the invention has been described in connection with specific embodiments thereof, it will be understood that these are not to be regarded as limitations upon the scope of the invention except insofar as included in the accompanying claims.

I claim:

1. In a solids settling system, apparatus comprising a settling tank supplied with a suspension of solids, a vertically positioned duct mounted in said settling tank, a first tubular member and a second tubular member mounted within said duct, said tubular members having the tops thereof open above the normal liquid level in said duct and having the bottom outlets positioned at spaced elevations within said duct, a first air conduit connected to a source of air under pressure and positioned within said tubular member with outlet below the normal liquid level thereof, a second air conduit connected to said source of air under pressure and positioned below the normal liquid level within said second tubular member, a branch member extending from each of said air conduits interconnected by means responsive to difference in back pressure between said air conduits, a liquid conduit having the outlet thereof positioned within said duct and having the inlet thereto elevationally movable within said tank, and means for moving suspension of settling solids through said liquid conduit.

2. In a solids settling system, in combination a settling tank receiving a suspension of solids, a duct mounted in said settling tank, a first and second tubular member mounted within said duct, said tubular members having their tops open above the normal liquid level in said duct and having the bottom outlets thereof positioned at spaced elevational levels within said duct, air conduits connected to a source of air under pressure and positioned within each of said tubular members with the outlets thereof submerged to the same elevational level below the normal liquid level in said duct, branch members extending from each of said air conduits interconnected by means responsive to difference in back pressure between said air conduits and adapted to provide a signal for control mechanism actuation, a liquid conduit having the outlet thereof positioned within said duct and having the inlet thereto positioned outside of said duct, said inlet being elevationally movable, and means for moving suspension of settling solids through said liquid conduit.

3. In a solids settling system, in combination a settling tank receiving a suspension of solids, a substantially vertically positioned duct mounted in said settling tank with bottom outlet submerged in said suspension and adapted with an enlarged head portion, a first and a second tubular member mounted within said duct, said tubular members having their tops open above the normal liquid level in said enlarged head portion of said duct and having the bottom outlets thereof positioned at spaced elevational levels within said duct, air conduits connected to a source of air under pressure and positioned within each of said tubular members with the outlet thereof below the normal liquid level therein, branch members extending from each of said air conduits interconnected by means actuated by difference in back pressure between said air conduits and adapted to provide a signal for control mechanism actuation, a liquid conduit having the outlets thereof positioned within said duct and having the inlet thereto positioned outside of said duct, said liquid conduit having a cap member isolating the outlet portion of said liquid conduit from the interior of said enlarged head portion of said duct and said cap member having an outlet positioned below the elevational level of said outlet from said liquid conduit, and means for moving said suspension of solids through said liquid conduit.

4. Apparatus for measuring the density of solids relative to the liquid of said suspension positionable within a solids settling tank comprising a vertically positioned duct mounted in said settling tank and having an enlarged head portion, a first and a second tubular member mounted within said duct, said tubular members having their tops open above the normal liquid level in said duct and having the bottom thereof positioned at spaced elevational levels within said duct, air conduits connected to a source of air under pressure and positioned within each of said tubular members with the outlet thereof below the normal liquid level therein, branch members extending from each of said air conduits interconnected by means responsive to difference in back pressure between said air conduits and adapted to provide a signal for control mechanism actuation, a liquid conduit traversing one wall of said duct whereby the outlet thereof is positioned within the head portion of said duct, said liquid conduit consisting of jointed conduit sections, the joint between said sections being such that the lower pipe section is rotatable in a plane to any elevational level within said tank, means for turning said lower conduit section on said pivotal mounting and air introduction means communicating with the interior of said liquid conduit whereby suspension of solids is caused to flow through said liquid conduit.

5. Apparatus for measuring the density of a suspension of solids relative to the liquid of said suspension positionable within a settling tank comprising a vertically positioned duct mounted in said settling tank and having an enlarged head portion, a first and a second tubular member mounted within said duct, said tubular members having their tops open above the normal liquid level in said duct and having the bottom thereof positioned at spaced elevational levels within said duct, air conduits positioned within each of said tubular members with the outlet thereof below the normal liquid level therein, said air conduits being connected to a source of air under pressure, branch members extending from each of said air conduits interconnected by means responsive to difference in back pressure between said air conduits, a liquid conduit traversing one wall of said duct whereby the outlet thereof is positioned within said duct, said liquid conduit consisting of jointed conduit sections, the joint between said sections being such that the lower pipe section is rotatable in a plane to any elevational level within said tank, means for turning said lower conduit section on said pivotal mounting and means for moving liquid communicating with the interior of said liquid conduit whereby suspension of solids is caused to flow through said liquid conduit.

6. The method of measuring the density of a suspension of solids relative to the liquid of said suspension which comprises establishing within a liquid flow course whose bottom outlet communicates with said suspension, two substantially quiescent columns of the liquid of said suspension, said columns having the upper liquid surface in contact with the atmosphere and the bottom of each column connecting at elevationally spaced points with a body of suspension of solids in said liquid flow course, moving a suspensoin of solids removed from a predetermined level in the suspension through said liquid flow course, continuously obtaining a measurement of the elevation of the surface of the liquid in each column above the liquid level of said suspension maintained in said liquid flow course and bringing the measurements in the two columns together in opposing relationship at a point outside of said body of suspension whereby means movable in response to the difference in said measurements provides a measure of the relative density of said suspension of solids.

References Cited
UNITED STATES PATENTS

| | | | |
|---|---|---|---|
| 1,621,535 | 3/1927 | Haultain | 73—438 |
| 2,056,187 | 10/1936 | Hay | 73—438 |
| 2,089,862 | 8/1937 | Sprague et al. | 73—438 |
| 2,451,604 | 10/1948 | Barnes | 73—438 |
| 2,886,051 | 5/1959 | Kroll et al. | 73—439 |
| 3,233,453 | 2/1966 | Lebourg | 73—155 |
| 2,345,180 | 3/1944 | Cook | 73—438 |

FOREIGN PATENTS 1,102,129  3/1954  France.

RICHARD C. QUEISSER, *Primary Examiner.*

C. IRVIN McCLELLAND, *Assistant Examiner.*